United States Patent [19]
Mills

[11] 3,924,490
[45] Dec. 9, 1975

[54] VARIABLE RATIO DRIVE UNIT AND METHOD

[76] Inventor: Ned D. Mills, 2725 Riverside Drive, West Richland, Wash. 99352

[22] Filed: May 21, 1974

[21] Appl. No.: 471,904

[52] U.S. Cl. .................................. 74/752 E; 74/782
[51] Int. Cl.² ...................... F16H 3/74; F16H 57/10
[58] Field of Search ........... 74/752 E, 782, 786, 790

[56] References Cited
UNITED STATES PATENTS

| | | | |
|---|---|---|---|
| 2,278,351 | 3/1942 | Havens et al. .......................... 74/782 |
| 2,330,375 | 9/1943 | Orner ............................. 74/752 E X |
| 2,581,886 | 1/1952 | Rockwell .............................. 74/782 |
| 2,604,799 | 7/1952 | Hinton ............................... 74/782 X |
| 2,655,056 | 10/1953 | Clintsman .......................... 74/752 E |
| 2,995,049 | 8/1961 | Bolliger ............................ 74/790 X |
| 3,234,822 | 2/1966 | Young ............................... 74/790 X |
| 3,240,083 | 3/1966 | Stoddard ............................ 74/782 X |
| 3,447,400 | 6/1969 | Serniuk ................................. 74/782 |

*Primary Examiner*—Benjamin W. Wyche
*Assistant Examiner*—Lance W. Chandler
*Attorney, Agent, or Firm*—Mason, Fenwick & Lawrence

[57] ABSTRACT

An automatic variable ratio drive unit for vehicles such as motorcycles and the like is disclosed including an epicyclic gear train with an input gear which drives planetary gears carried on a planetary gear carrier having an integral output gear. Rotation of the planetary gears is resisted by a sun gear which engages the planetary gears and also drives a hydraulic pump. Two governors interact to control the rate of rotation of the sun gear by actuating valve means to restrict the output of the pump to consequently increase the rotational speed of the planetary gear carrier. The first governor maintains the pump and sun gear at a constant rate of rotation when the input gear reaches a first predetermined rate of rotation and the second governor overrides the first governor when the input gear reaches a second predetermined rate of rotation to further restrict the output of the pump thereby decreasing the rate of rotation of the pump and sun gear to decrease the gear ratio between the input gear and the output gear. A second embodiment of the preferred invention utilizes in place of the actuating valve means a variable displacement pump motor device drivingly connected to the planetary gear carrier and having an inlet and outlet with the inlet of the variable displacement device being connected to the outlet from the gear pump, and a respond valve means in the outlet to the gear pump being connected to bypass the output of the gear pump to a sump at idling speeds to accomplish disengaging of the transmissions. Two governors interact to control the rate of rotation of the sun gear by controlling the displacement of the variable displacement pump after shifting the valve means to supply the full output of the gear pump to the variable displacement device when the rate of rotations of the input gear exceeds the idling speed. The first governor maintains the gear pump and sun gear at a constant rate of rotation when the input gear reaches a first predetermined rate of rotation and the second governor overrides the first governor when the input gear reaches a second predetermined rate of rotation to further restrict the output of the gear pump thereby decreasing the rate of rotation of the pump and sun gear to decrease the ratio between the input gear and the output gear. The second embodiment may be operated without the second governor and only with the first governor controlling the valve means. The displacement of the variable displacement pump motor device may be controlled manually and for each displacement the transmission will produce a fixed gear ratio between the input gear and the output gear.

26 Claims, 13 Drawing Figures

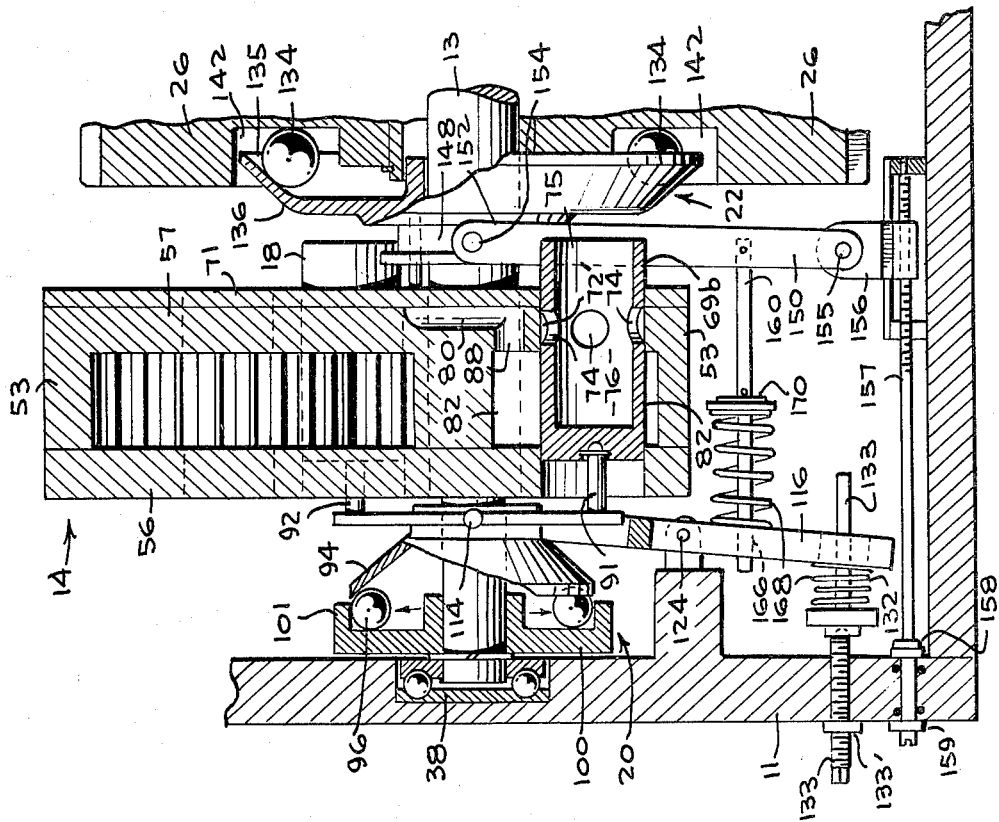

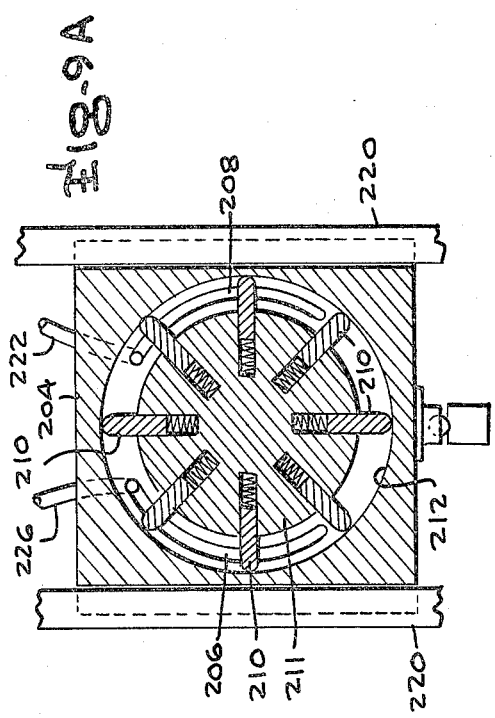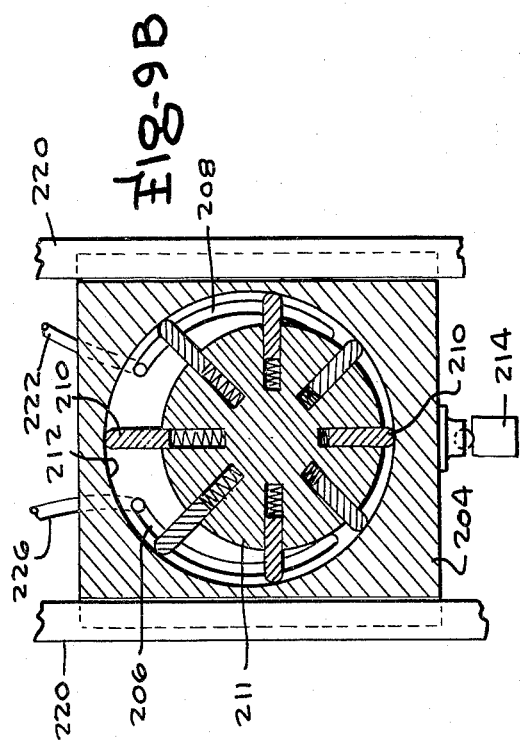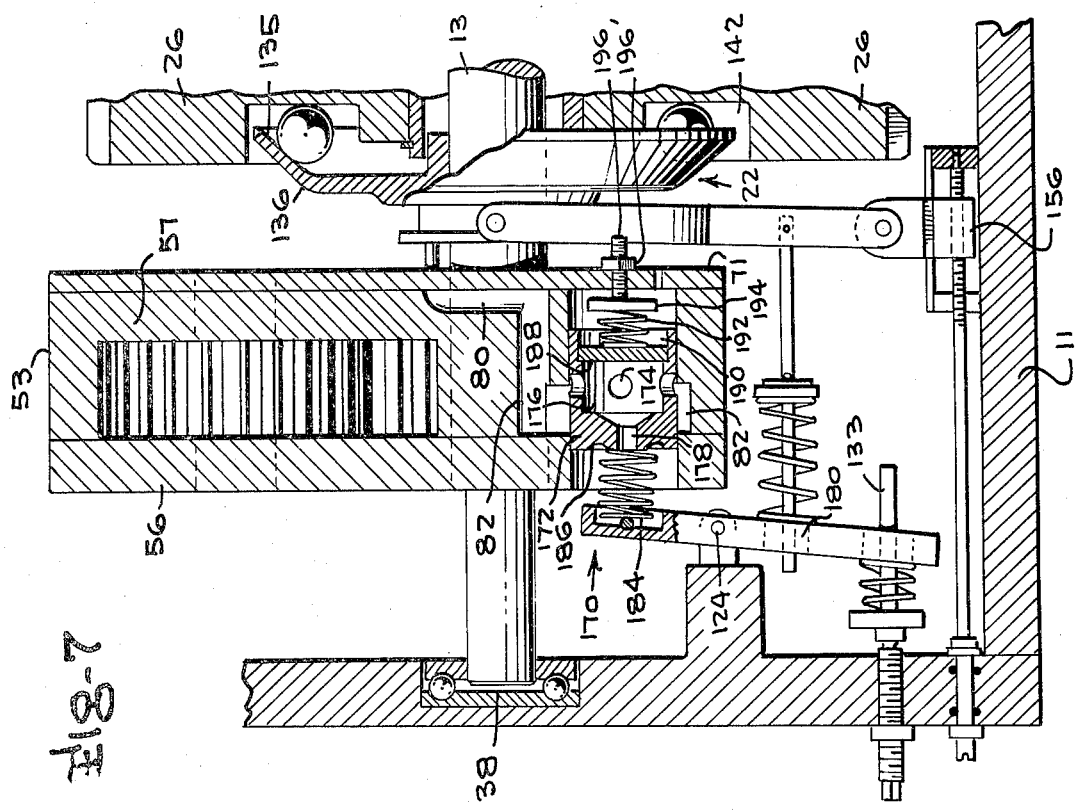

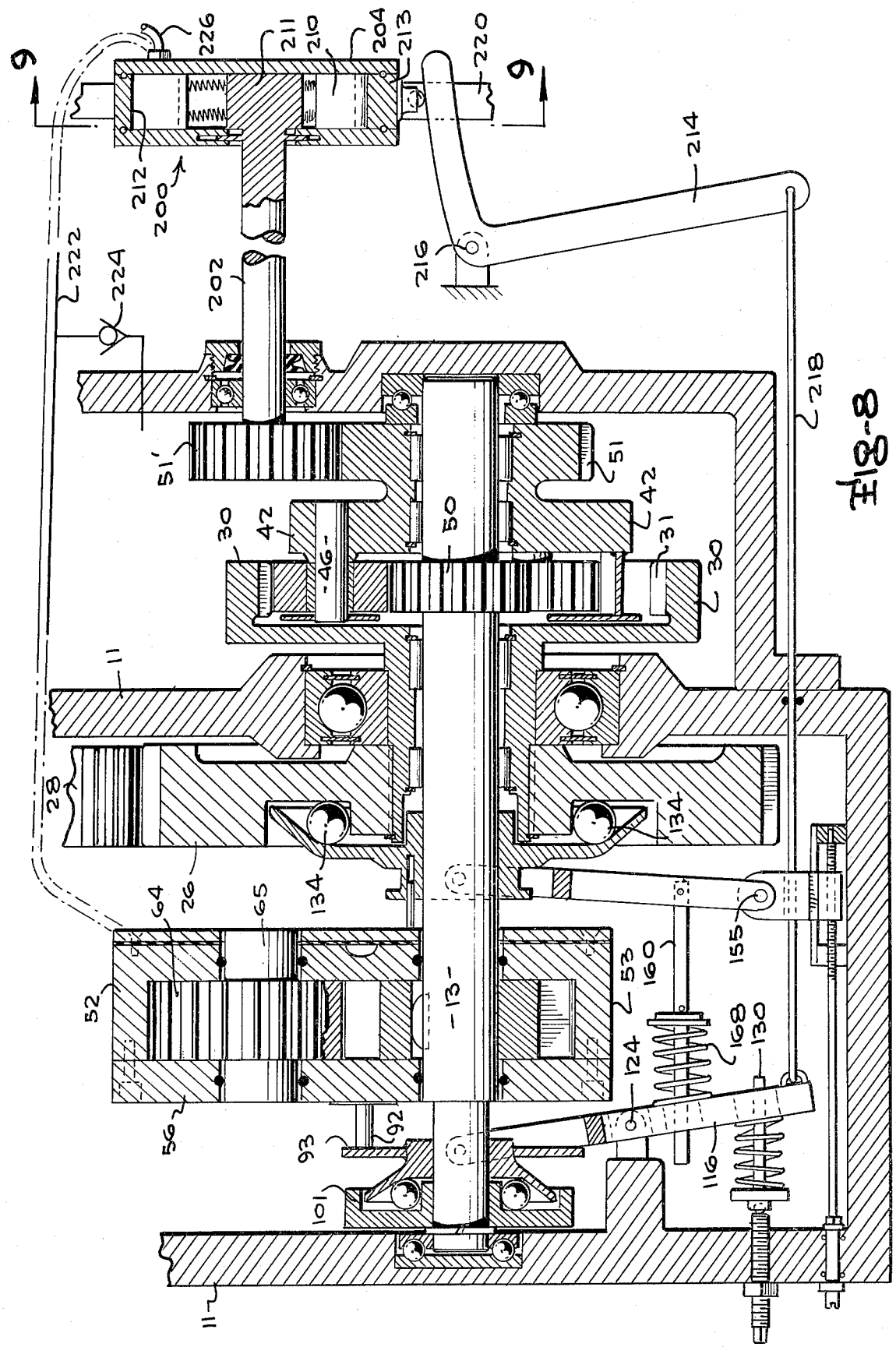

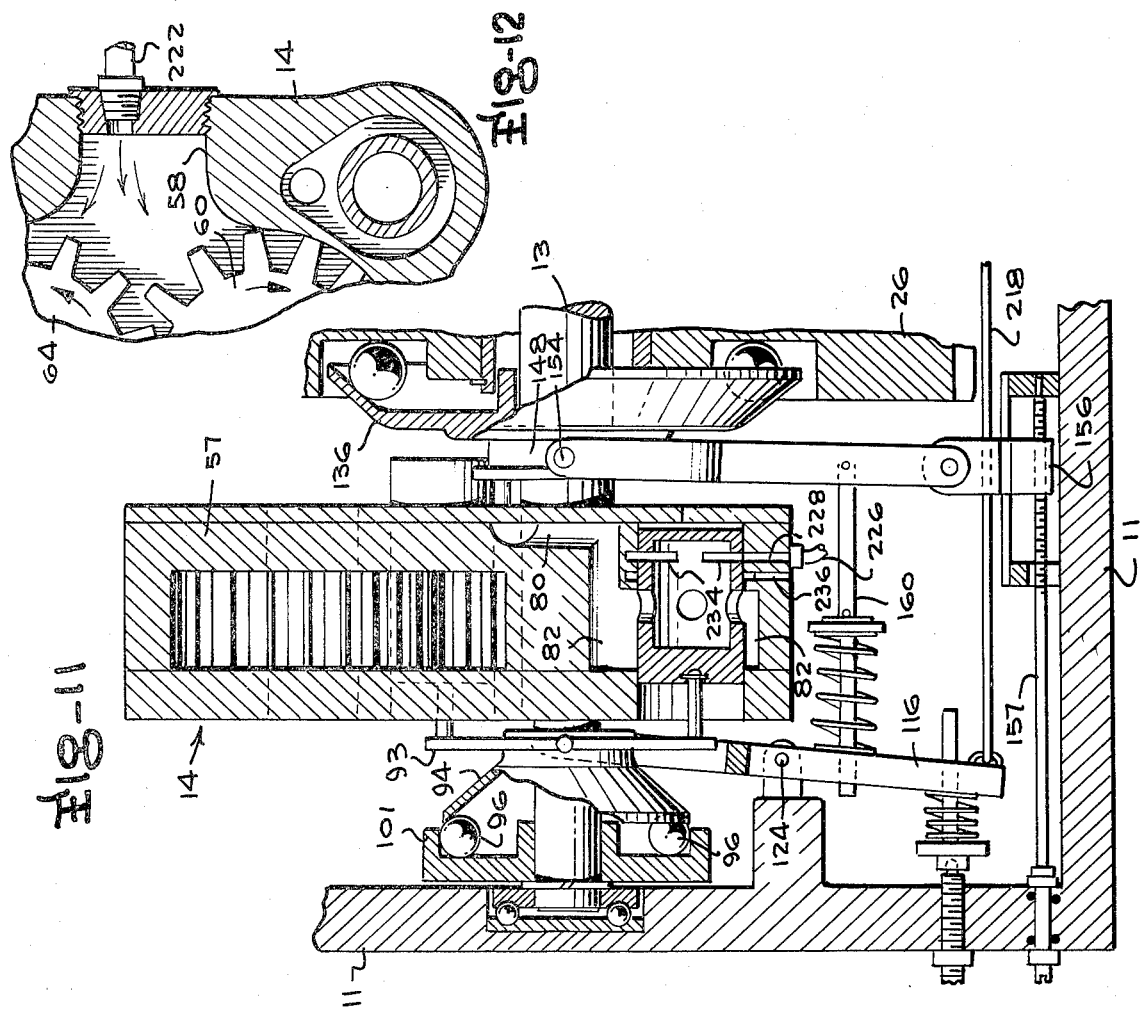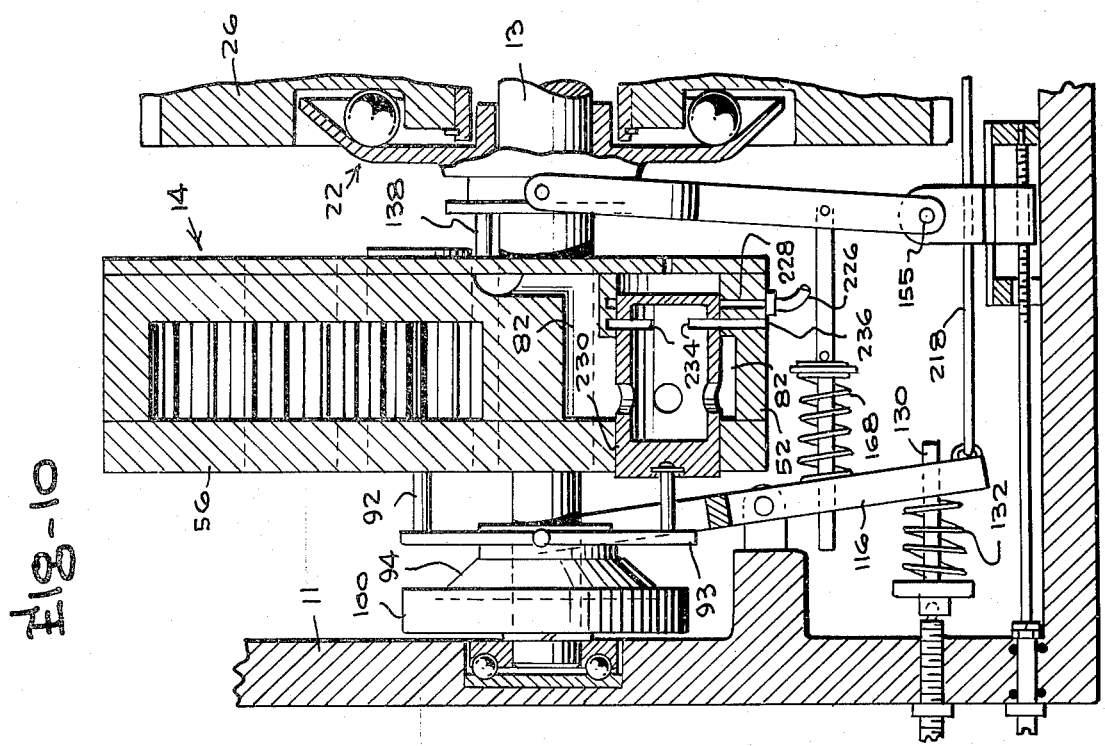

VARIABLE RATIO DRIVE UNIT AND METHOD

BACKGROUND OF THE INVENTION

The present invention relates in general to power transmission speed control apparatus and is more specifically directed to the field of automatic variable ratio drive units capable of use on stationary equipment and as an automatic transmission for vehicles such as motorcycles, snowmobiles, beach or dune buggies, golf carts, go-karts, pleasure boats, all-terrain vehicles, off-road traction vehicles and heavier vehicles such as trucks, busses, automobiles, tractors, self-propelled farm and construction vehicles and the like.

Even more specifically, the present invention is directed to a governor-controlled epicyclic gear train having automatic control means for varying the gear ratio between the input and the output of the gear train in accordance with the rotational speed of the power input to the gear train.

Prior known variable speed transmissions have suffered from a wide variety of deficiencies and drawbacks for which many solutions have been proposed as evidenced by the large number of patents issued in this field.

One of the primary problems encountered in known variable speed transmissions is the fact that such transmissions have been inefficient in operation and have consequently had high energy losses necessitating the use of complex cooling devices to remove excessive heat from the transmission. Such basic inefficiency requires the source of power employed with such variable speed transmissions to have greater power capacity than would be the case if the transmissions were more efficient in operation. Moreover, the necessity of employing complex cooling devices and the like obviously adds to the cost of the transmission both in terms of initial cost and maintenance expenses.

Other prior known variable speed transmissions have suffered from the drawback of being overly complex in their construction due to the extensive use of various combinations of pumps, valves, pulleys, belts, clutches, gears, brakes and the like which not only make the transmissions complex and trouble-prone but also usually result in an excessively heavy construction.

Yet another problem with prior known variable speed transmissions is that such transmissions require frequent adjustment, maintenance and replacement of their components which increases the cost of operating the devices both as a direct result of the maintenance procedures and as a result of the down time for the apparatus in which the units are employed.

That the foregoing problems have not been satisfactorily solved is evidenced by the fact that there are at present no accepted automatic variable speed transmissions for vehicles such as motorcycles presently on the market. While efforts have been made to provide automatic transmissions for motorcycles, existing known transmissions have proven to be too heavy and bulky for effective use in this service. Moreover, the rough usage to which motorcycle transmissions are frequently subjected renders many of the known variable speed transmissions unacceptable for such use.

Other prior known variable speed transmissions require manual adjustment of the transmissions for effecting a change in the speed ratio between the input and the output. One such prior known transmission is disclosed in U.S. Pat. No. 3,447,400 to Serniuk. The Serniuk patent discloses a rugged device which overcomes many of the problems of the previously known variable speed transmissions by using a manually controlled hydraulic gear pump to control the rate of rotation of a low torque member connected to the sun gear of an epicyclic gear train. However, speed ratio adjustment between the power input and the power output of the Serniuk device can only be accomplished by means of a manual adjustment of valve means associated with the output of the gear pump. Consequently, the device of the patent is not satisfactory for use as an automatic variable speed transmission for use in a vehicle or the like in which the speed ratio must be quickly and automatically varied in accordance with the input speed of the power source.

Therefore, the primary object of the present invention is the provision of a new and improved automatic variable ratio drive transmission.

Yet another object of the subject invention is the provision of a new and improved automatic variable ratio drive unit utilizing an epicyclic gear train for use as an automatic transmission on vehicles generally, and particularly on motorcycles.

Another object of the subject invention is the provision of an automatic variable ratio drive unit providing self-clutching capability to provide positive power transmission when desired yet allowing the engine to idle without applying torque to the output of the transmission.

An additional object of the present invention is the provision of external adjustment of the operating characteristics of the transmission which provides adaptability not available in other automatic transmissions.

A still further object of the present invention is the provision of a variable ratio drive unit for a vehicle which controls an output shaft speed relative to the engine speed in direct correlation with the requirements of vehicular movement.

An additional object of the present invention is the provision of a variable ratio drive unit which produces a minimum of energy losses.

A further object of the present invention is the provision of a manually adjustable fixed ratio drive unit which produces a minimum of energy losses and automatically declutches at idle speeds.

Yet another object of the present invention is the provision of a variable ratio drive unit which provides maximum efficiency by automatically controlling the transmission gear ratio in response to the speed of rotation of the power source for the drive unit.

SUMMARY OF THE INVENTION

The present invention in its preferred embodiment achieves the foregoing objects by the provision of a rugged and trouble-free automatic variable gear ratio unit of relatively simple and inexpensive construction which automatically transmits torque when the engine reaches a predetermined rate of rotation and automatically controls the output gear speed relative to the engine speed in direct correlation with the requirements of vehicular movement. Specifically, the foregoing results are achieved by automatically controlling the rate of rotation of a sun gear which meshes with and provides reactive forces to planetary gears on a planetary gear carrier having an integral power output gear. An engine driven input gear meshes with the planetary gears and therefore drives the gear carrier and the integral output gear at a controlled gear reduction ratio over the input drive gear. The sun gear drives a positive displacement pump such as a gear type hydraulic pump and the output of the pump is varied by valve means controlled by governor means for controlling the rate of rotation of the sun gear to produce a desired gear reduction ratio for each input gear speed from an infinite ratio no torque transmission at low engine speeds to a minimum desired ratio at maximum engine speed conditions.

In a second embodiment of the preferred invention, the output of the gear type hydraulic pump is utilized to drive a variable displacement pump motor device which is drivingly connected to the planetary gear carrier. In this embodiment, the governors interact to control the rate of rotation of the sun gear by controlling the displacement of the variable displacement pump after the output of the hydraulic pump is shifted to the variable displacement pump as hereinafter discussed.

It will be seen that the subject invention is of rugged trouble-free nature and is both simple and inexpensive to construct and maintain while providing optimal functional results. Consequently, the subject invention achieves its desired objects and represents a substantial advance in the art of automatic variable ratio drive units.

A better understanding of the manner in which the subject invention achieves the foregoing objects as well as other objects and advantages of the invention will become more apparent when the following detailed description is considered in conjunction with the accompanying drawings described hereinafter.

DESCRIPTION OF THE DRAWINGS

FIG. 5 is a sectional view taken along lines 5—5 of FIG. 4 illustrating portions of the hydraulic gear pump and the associated control valves and governor means with the governor means being in an unactuated condition;

FIG. 6 is a sectional view taken along the same lines as FIG. 5 but illustrating the governor means in an actuated condition;

FIG. 7 is the same sectional view as FIG. 5 but illustrated an alternative governor means in an actuated condition;

FIG. 8 is a bisecting sectional view of an alternative embodiment illustrating the housing, the epicyclic gear, a governor means incorporating a variable displacement pump and support bearings for the various components;

FIG. 9A and 9B are sectional views of the variable displacement gear pump taken along lines 9—9 in FIG. 8 but illustrating the parts in different positions of adjustment;

FIG. 10 is the same sectional view as in FIG. 5; however, it shows the control valves associated with the embodiment in FIG. 8 in an unactuated position;

FIG. 11 is a sectional view taken along the same lines as in FIG. 10 but illustrating the governor means in an actuated condition; and FIG. 12 is a partial sectional view taken along the same lines as FIG. 4 but illustrating the connection of the return line from the variable displacement pump to the hydraulic gear pump as in the embodiment shown in FIG. 8.

DESCRIPTION OF THE PREFERRED EMBODIMENT

Figure 2:
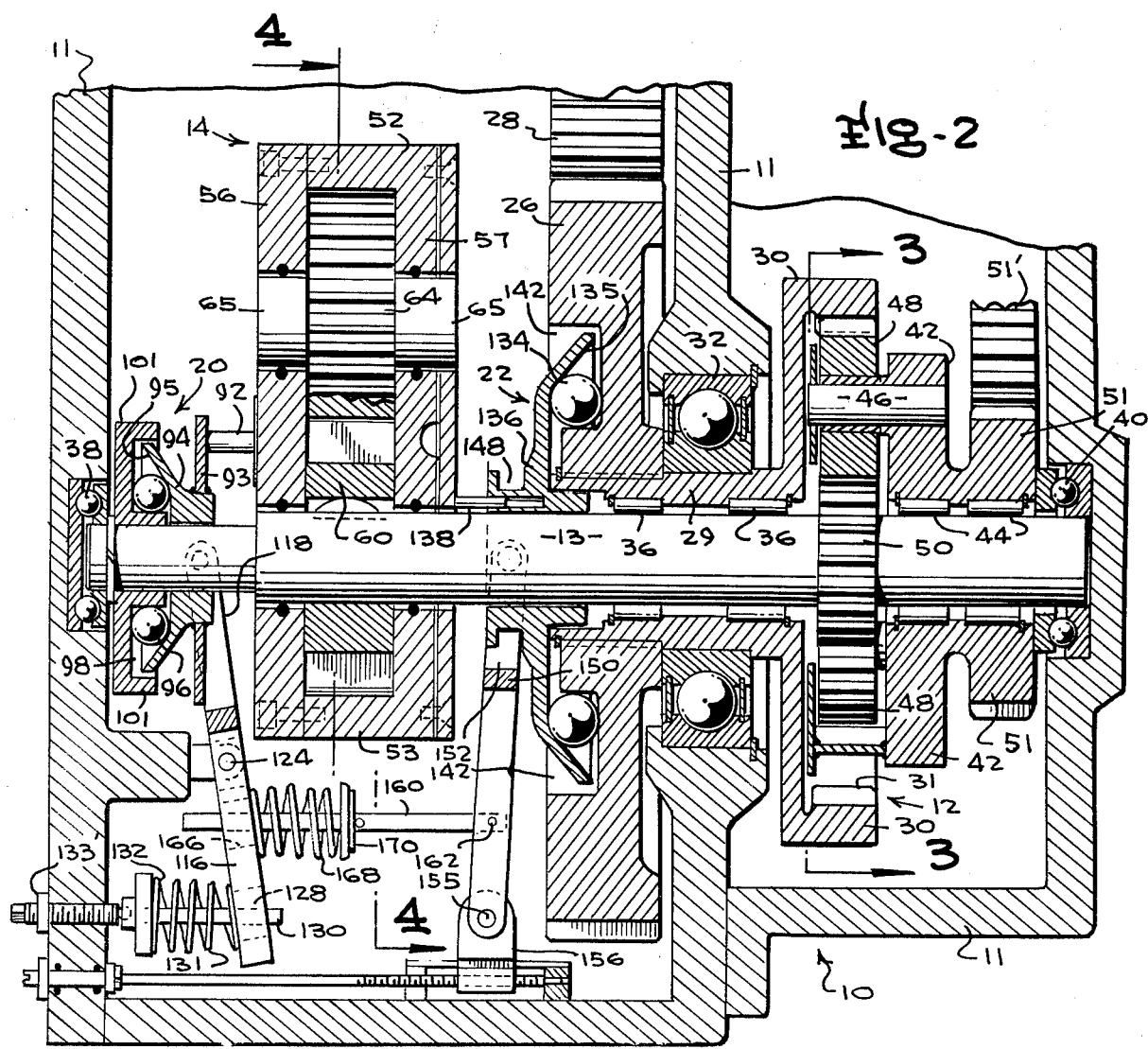
FIG. 2 is a bisecting sectional view of the preferred embodiment illustrating the housing, the epicyclic gear train, the governor means, and the support bearings for the various components.

Attention is initially invited to FIG. 2 of the drawings which illustrates an automatic variable ratio drive unit, generally designated 10, which comprises the preferred embodiment of the invention. Drive unit 10 includes a housing or casing 11 which supportedly encloses an epicyclic gear train 12, a main shaft 13, a hydraulic gear pump 14 in which a first control valve spool 16 and a second control valve spool 18 are mounted along with a pump speed governor 20 and an engine speed governor 22.

All of the elements of the automatic variable ratio drive unit are contained within the rigid housing 11 with input power to the epicyclic gear train 12 being transmitted to a primary input gear 26 by an engine output gear 28 (FIG. 1) which meshes with the primary input gear 26 and is driven from an engine or motor by any conventional means (not shown).

Turning now to FIG. 2, it will be noted that the primary input gear 26 is splined to a rotary support sleeve 29 coaxially positioned with respect to the main shaft 13. Rotary support sleeve 29 is formed unitarily with an internal ring gear 30 having inwardly extending gear teeth 31. Rotary support for the rotary support sleeve 29 is provided by main support bearing means 32 mounted in bearing support portions of the housing 11 and engaging the outer surface of the sleeve 29 as best illustrated in FIG. 2. In addition, internal support for the sleeve 29 is provided by roller bearings 36 engaging the inner surface of the sleeve 29 and the outer surface of the main shaft 13. Support for the main shaft 13 is provided in the end walls of the casing 11 by bearings 38 and 40 engaging opposite ends of the shaft as illustrated in FIG. 2.

Figure 3:
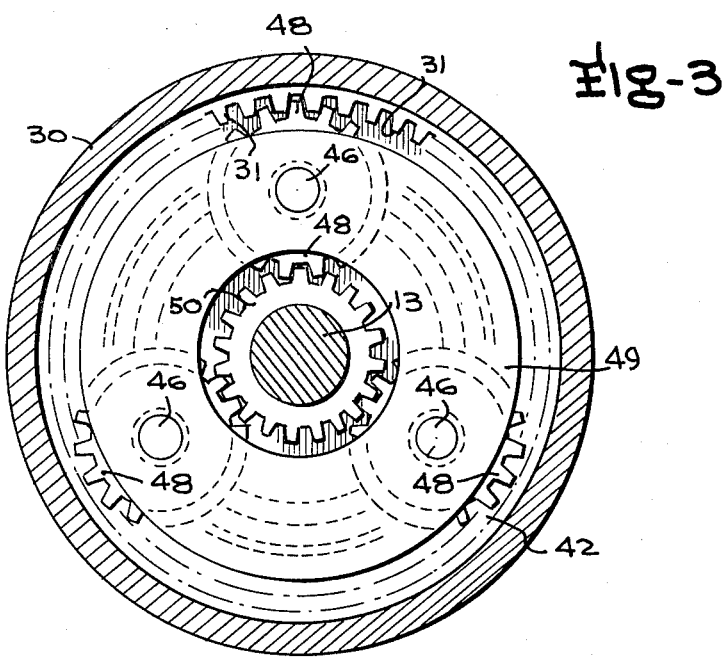
FIG. 3 is a sectional view of the preferred embodiment taken along lines 3—3 of FIG. 2.

A planetary gear carrier 42 is supported for rotation on main shaft 13 by roller bearings 44 with three planetary gear supporting shafts 46 being fixedly mounted in outer peripheral portions of the gear carrier 42. Each of the planetary gear support shafts 46 provides rotary support for planetary gears 48 which are retained in position on respective shafts 46 by means of an annular gear retaining plate 49 frictionally received over the end of the shafts 46. The teeth of the planetary gears 48 mesh with the inwardly extending teeth 31 of the internal ring gear 30 as best shown in FIGS. 2 and 3. Additionally, the planetary gears 48 also mesh with a sun gear 50 which is fixedly attached to main shaft 13.

A power output gear 51 is unitarily formed with the planetary gear carrier 42 and is meshingly engaged with the teeth of a power take-off gear 51' only a portion of which is illustrated in FIG. 2. It should be understood that the power take-off gear 51', or its functional equivalent, can be drivingly connected to the drive wheels of a vehicle such as a motorcycle or the like in accordance with the particular environment in which the preferred embodiment of the invention is being employed.

Control means for automatically controlling the epicyclic gear train by adjusting the permissible speed of rotation of the sun gear 50 to consequently vary the drive ratio between the primary input gear 26 and the power output gear 51 will now be discussed with attention being initially invited to FIGS. 1 and 2 which illustrate the details of the hydraulic gear pump 14. The pump components are mounted in a pump housing 52 supported on the interior of housing 11 by a bracket 54. Pump housing 52 includes a peripheral wall portion 53 and first and second apertured side walls 56 and 57 through which the main control shaft 13 extends. The space between the peripheral wall 53 and the side walls 56 and 57 comprises an internal pump chamber consisting of a high pressure portion C and a low pressure portion C' with an inlet opening 58 in wall portion 53 providing external communication with the low pressure portion C'. Opening 58 permits the inflow of hydraulic fluid from the interior of housing 11 into the pump housing as illustrated in FIG. 4.

The high pressure portion C of the pump chamber is separated from the low pressure portion C' by a driven impeller gear 60 keyed to the main shaft 13 and an impeller gear 64 rotatably supported in the pump cavity for meshing engagement with gear 60 by a shaft 65 extending between the first and second side walls 56 and 57. The gears 60 and 64 are of a width equal the distance between the inner faces of the side walls 56 and 57 so that the sides of the gears sealingly engage the side walls.

Control valve spools 16 and 18 each comprise a cylindrical axially movable sleeve member 69 mounted for reciprocation in axially aligned bores 70 and 70'. Bore 70 is provided in the first side wall 56 while bore 70' is provided in the second side wall 57 as best illustrated in FIG. 5. Each of the movable sleeves 69 include inflow openings 74 extending through the sleeve wall to provide communication with an internal sleeve chamber 76 having an open discharge end 75 communicating with the exterior of the pump as best illustrated in FIG. 5.

Figure 4:
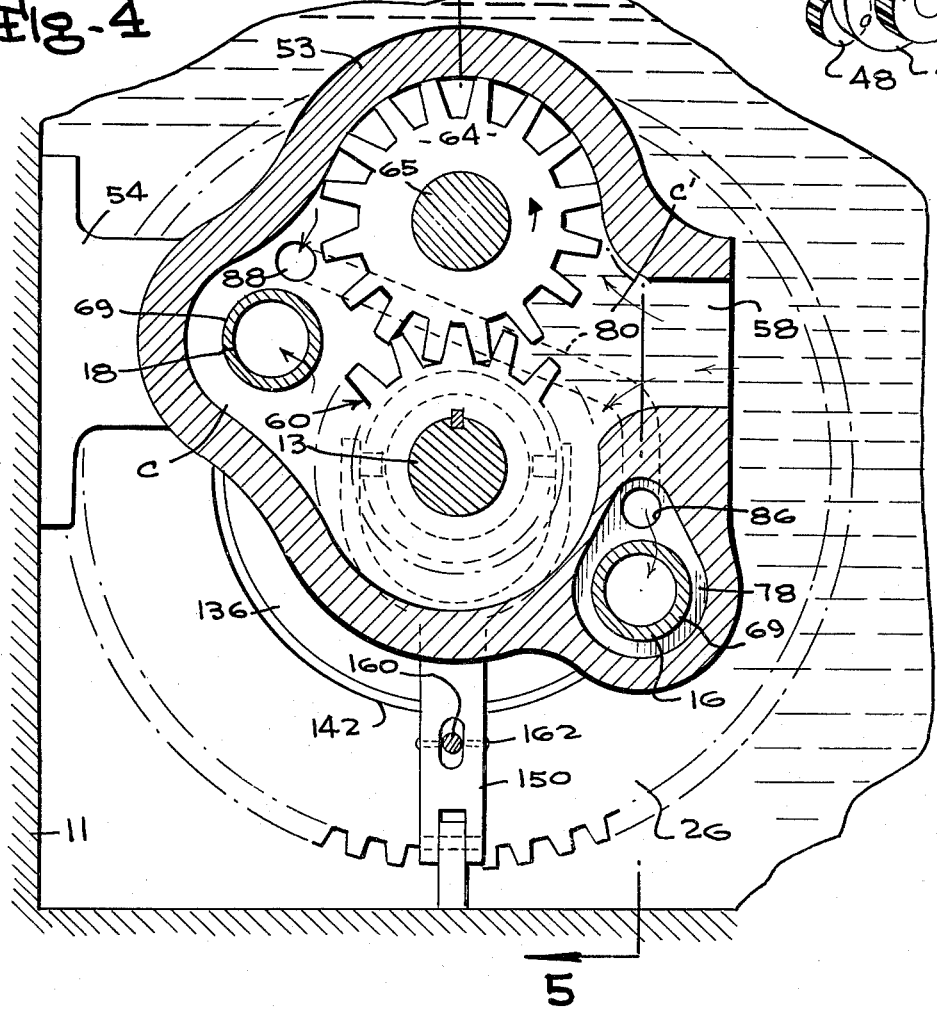
FIG. 4 is a sectional view of the hydraulic gear pump and control valves associated therewith taken along lines 4—4 of FIG. 2.

The first control valve spool 16 is mounted in a high pressure chamber 78 of the pump housing 52 which communicates with the high pressure section of the pump chamber C by means of a passageway 80 (FIG. 4). Passageway 80 is formed by a groove in the outer wall portion 57 which is covered by a face plate 71. The end 86 of passageway 80 communicates with chamber 78 and the end 88 of passageway 80 communicates with the high pressure portion C of the pump chamber as illustrated in FIG. 4. It is to be noted that the valve spools 16 and 18 are located on diametrically opposite sides of the main control shaft 13 and that the hydraulic pressure externally of each of the valve spools is the same by virtue of the passageway 80 providing communication between the two areas of the pump housing in which the valve spools are located.

Pump speed governor 20 is connected to the valve spools 16 and 18 by two control rods 91 and 92 respectively connected on one end to the valve spools and on an opposite end to a movable control plate 93. Control plate 93 is fixed to the end of a conical sleeve 94 of the governor 20. Conical sleeve 94 is mounted for axial movement on the main shaft 13 and a plurality of governor balls 96 are provided in engagement with its interior tapered conical surface 95 as shown in FIG. 2.

Balls 96 are free to rotate on a flanged retainer disc 100 having a peripheral rim flange 101 and the flanged retaining disc 100 is fixed to shaft 13. Rotation of shaft 13 causes the disc 100 and the governor balls 96 to rotate with increases in speed of rotation resulting in outward movement of the governor balls. Such outward movement of the balls 96 moves the conical sleeve 94 to the right as viewed in FIG. 2. Consequently, the control rods 91 and 92 are also moved to the right to move the valve spools 16 and 18 from an open position (FIG. 5) toward a closed position (FIG. 6) with increases in speed of rotation of the shaft 13.

Figure 1:
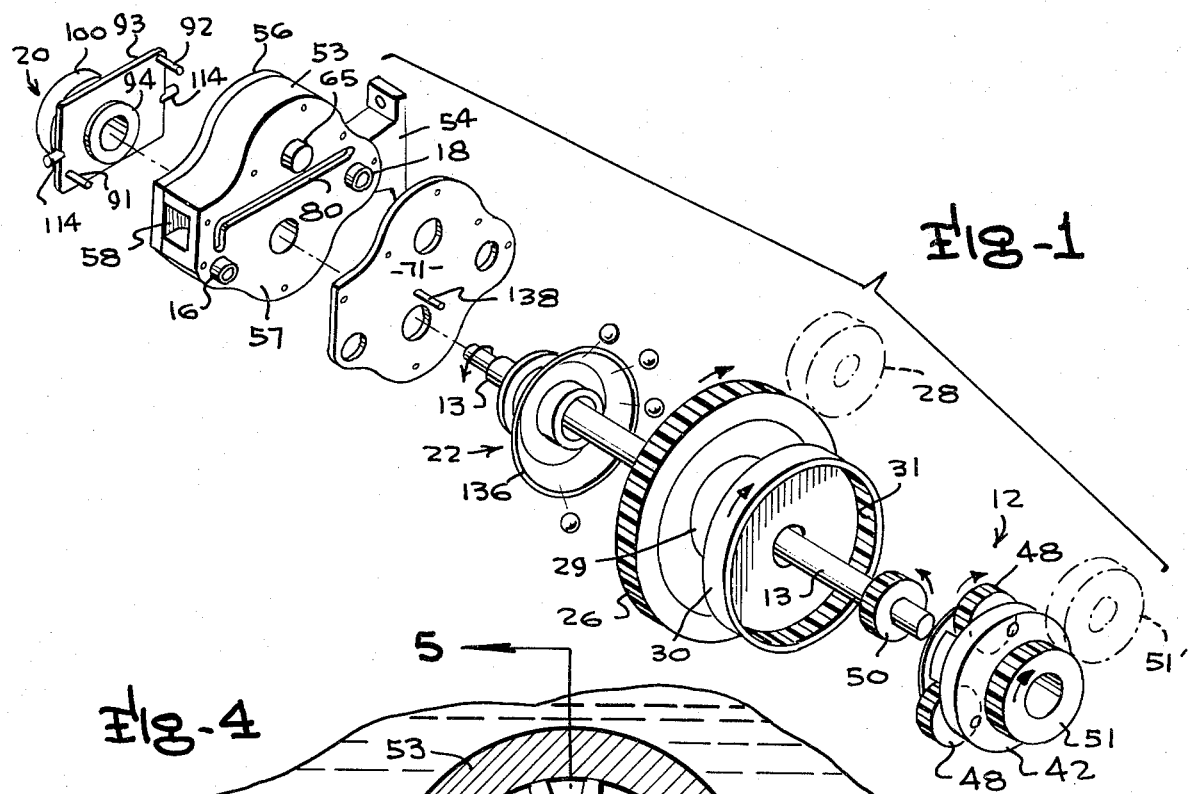
FIG. 1 is an exploded perspective view of the preferred embodiment of the subject invention illustrating the epicyclic gear train, the hydraulic gear pump and portions of the governor means for controlling the gear pump.

Control plate 93 is provided with pins 114 extending from opposite sides of the plate as illustrated in FIG. 1 and which are received in slots 120 in the upper end of legs 118 of a bifurcated control link 116 pivotally mounted on a pivot pin 124 in the casing 11. Consequently, movement of the conical sleeve 94 to the right as viewed in FIG. 5 results in clockwise rotation of the bifurcated link 116 about pivot pin 124. A slot 128 is provided in the lower end of the control link 116 with a guide rod 130 extending through the slot and threaded into casing 11 as illustrated in FIG. 2. A coil compression spring 131 mounted on the guide rod 130 between a stop plate 132 fixed to the guide rod and the lower end of the link 116 urges the link in a counterclockwise direction to resist the forces applied by rightward movement of plate 93. Consequently, the force of spring 131 resists the centrifugal force of balls 96 and can be adjusted with slot 133 and lock nut 133' to provide desired operating characteristics for the control system.

The engine speed governor 22 is similar in construction to the pump speed governor 20 and includes a plurality of governor balls 134 mounted to engage the inner surface 135 of a conical sleeve 136. It should be noted that the outer portion of the conical sleeve 136 and the governor balls 134 are mounted in an annular groove 142 formed on one face of the primary power input gear 26 as best illustrated in FIGS. 2 and 6. The conical sleeve 136 is mounted for axial movement with respect to the main shaft 13 with movement to the left as viewed in FIG. 2 being caused by the centrifugal force of the balls 134 resultant from increases in speed of the power input gear 26. The sleeve 136 is limited to axial movement by pin 138 mounted on face plate 71 as seen in FIGS. 1 and 2.

A circumferential groove 148 is provided in conical sleeve 136 for connection to a second bifurcated control link 150 having two legs 152 from which projections 154 extend into the circumferential groove 148. The lower end of the bifurcated control link 150 is pivotally mounted in the casing 11 by pivot means 155 in slidable pivot block 156 which is positioned axially with respect to casing 11 by slotted and threaded positioning rod 157. Annular disc 158 fixed to the rod permits lock nut 159 to lock the pivot block 156 in the desired position.

An interconnecting link 160 is pivotally connected to control link 150 by pin 162 and has its opposite end slidingly received in a slot 166 in the lower portion of the first bifurcated control link 116. A second compression spring 168 is mounted over the link 160 in engagement with the link 116 and a stop 170 on the link 160.

It should be noted that increased speed of rotation of the power input gear 26 will result in counterclockwise movement of link 150 providing a resultant force against link 116 tending to rotate link 116 in a clockwise direction to provide a force on plate 93 and rods 91 and 92 tending to move the valve spools 16 and 18 toward a closed position illustrated in FIG. 6.

In operation, the engine output gear 28 drives the input gear 26 along with the integral internal ring gear 30. Planetary gear carrier 42 is driven by the internal ring gear through the planetary gears 48 when rotation of sun gear 50 is restrained by the shaft 13. Restraint of the shaft 13 is provided by the gear pump 14; however, only a slight amount of restraint is provided by the gear pump when the valve spools 16 and 18 are in their open position illustrated in FIG. 5.

With the gear pump impeller gear 60 and idler gear 64 rotating in the direction of the arrows in FIG. 4, hydraulic fluid enters the pump through the inflow openings 58 to flow into the low pressure portion C' of the pump chamber. The fluid is then carried by the gears to the high pressure portion C of the pump chamber. The high pressure fluid exits from the pump via the valve spools 16 and 18 by flowing through the openings 74 to the valve chambers 76 and then outwardly through the open ends 75 of each of the valve spool members.

During low input speed operation, the sun gear 50 drives the shaft 13, the gear pump 14 and the gear pump speed governor 20 at a relatively low speed and the valve spools 16 and 18 are in the fully opened position illustrated by valve spool 16 in FIG. 5. Consequently, the hydraulic fluid is free to leave the high pressure portions of the pump chamber and there is a minimum amount of resistance to the rotation of the gears 60, 64 and shaft 13, etc. Under these conditions, the output of the hydraulic gear pump is unrestricted and the sun gear is free to rotate with the planetary gears merely rotating about their shafts without applying any substantial torque to the gear carrier 42.

As the rate of rotation of the power input gear increases, the shaft 13 and the pump 14 run at a faster rate and the centrifugal force of the governor balls 96 moves the conical sleeve 94 to the right of the FIG. 5 position to move the valve spools toward a closed position with the extent of movement depending upon the speed of rotation of the pump. As the valve spools move toward the closed position, the output of the pump will be gradually reduced to decrease the rate of rotation of the pump which in turn causes the valve spool to move to the left and decrease the restriction on the pump. The effect of this back and forth cycling of the valve is to control the rate of rotation of the pump at a constant rate thereby controlling the gear ratio between the input gear 26 and the output gear 51 at an intermediate value.

The springs 132 and 168 are of such relative strength that the gear pump governor provides the sole variation in the gear ratio until after the intermediate gear ratio is achieved. Thereafter, at a higher input speed, the governor 22 begins to override the governor 20 to provide a further closing of the valve spools 16 and 18 which decreases the speed of the pump and sun gear to decrease the gear ratio between the input gear 26 and the output gear 51. When the valve spools 16 and 18 are completely closed, the gear pump 14, shaft 13 and sun gear 50 are locked which provides a desired minimum gear ratio between the input gear 26 and the output gear 51. During a deceleration of the power input, the exact reverse occurs with the gear ratio relatively increasing under the operation of the input governor 22 until the intermediate gear ratio is reached at which time the governor 22 becomes ineffective and the governor 20 then becomes effective for providing further opening movement of the valve members 16 and 18 to increase the gear ratio by reducing resistance to rotation of sun gear 50.

An alternative pump speed governor 170, as shown in FIG. 7 can be employed in place of governor 20 and valve spools 16, 18 etc. and includes a single shortened valve spool 172 with inflow openings 174 extending through the sleeve wall to provide communication with an internal sleeve chamber 176 having a discharge orifice 178 communicating with the exterior of the pump. Control link 180 is identical to control link 116 except it carries a spring seat 182 instead of upper legs 118 and slots 120. The interconnecting link 160 functions as previously described and moves the control link 180 in a clockwise direction as speed governor 22 begins to override pump speed governor 170. A compression spring 184 presses against the spring seat 182 and an annular spring seat groove 186 in the face of the shortened valve spool 172. The internal sleeve chamber 176 is closed at the end opposite the discharge orifice 178 by closure disc 188 pressed or otherwise securely fastened in counter bore 190. A balance compression spring 192 seats against the closure disc 188 and an adjustable spring seat 194 fixed to the end of a threaded rod portion 196 which is threaded through a modified face plate 71 to permit an adjustment of the spring force applied to the shortened valve spool. The rod portion 194 is held in position by a lock nut 196' after the rod has been adjusted to the desired position.

In operation, the alternative pump speed governor 170 of FIG. 7 performs the same functions as the previously described pump speed governor 20 by controlling the output of the gear pump 14. Oil flowing through openings 174 in shortened valve spool 172 must flow out through restricted discharge orifice 178 which fact creates high pressure in sleeve chamber 176 resulting in a biasing force to the right as seen in FIG. 7. The biasing force cause the valve to move against a balance spring 192 throttling the inflow openings 174 until the force of the balance spring 192 equals the sum of the force applied by control link 180 plus the force of the oil pressure in chamber 176. The shortened valve spool 172 thus allows a predetermined maximum flow with any preset balance spring pressure. This maximum flow corresponds to a predetermined maximum pump rate of rotation since no amount of pressure increase will increase flow through shortened valve spool 172 and therefore it will perform the same functions as the pump speed governor 20. At higher input speeds, governor 22 begins to override pump speed governor 170 further throttling and eventually closing the inflow openings 174 to provide minimum ratio operation.

An alternative control system shown in FIG. 8 incorporates a conventional variable displacement pump motor device 200 which is drivingly connected to power output gear 51' by a power output shaft 202. The variable displacement pump 200 includes a housing 204 having an inlet port 206 and an outlet port 208 and outwardly biased vanes 210 mounted in radial slots in a driven cylinder 211 drivingly connected to the shaft 202. The outer ends of vanes 210 are urged into contact with cylinderical surface 212 of a slide block 213 attached to housing 204 which is movable with respect to the power shaft 202 to vary the displacement of the variable displacement pump in a well known manner. For example, positioning the power shaft in the center of the cylinder inner surface 212 as seen in FIG. 9A will result in no flow of fluid through the device while positioning in an eccentric position as seen in FIG. 9B will result in flow through the device in an amount in proportion to the eccentricity of cylindrical inner surface 212 with respect to cylinder 211.

Adjustment of slide block 213 in guides 220 relative to cylinder 211 is effected by a crank connecting link 218 pivotally connected to control link 116 and a crank link 214 mounted on a fixed pivot 216 as illustrated in FIG. 9B.

A return line 222 connects outlet port 208 of the variable displacement pump with the inlet port 58 of the gear pump 14 (FIG. 12) and communicates with the interior of the transmission housing 11 through check valve 224 (FIG. 8). Pressure line 226 connects the inlet port 206 of the variable displacement pump motor device 200 with an outlet port 228 (FIG. 10) in the gear pump housing 52. A valve member 230 (FIGS. 10 and 11) having an end wall 232 and outlet slots 234 is utilized in this alternative embodiment.

Housing 52 is modified by having two outlet ports 236 and 228 with port 236 communicating with the interior of the transmission housing 11 and the outlet port 228 being connected to line 226.

The operation of the alternative governor system shown in FIG. 8, 9, 10, 11 and 12 is similar to that of the preferred embodiment; however, the variable displacement pump motor device 200 control links 214 and 218 and valve member 230 perform the same function as the valve spools 16 and 18 of the preferred embodiment. In the alternative embodiment the output of the gear pump 14 is utilized to drive the variable displacement pump 200 thereby recovering the energy wasted in the preferred embodiment in which the output of the gear pump is throttled to the interior of the transmission housing. Initially, the outlet slots 234 on valve members 230 are aligned with the outlet port 236 as in FIG. 10 and unrestricted flow from the gear pump 14 is permitted. The sun gear is then free to rotate with the planetary gears merely rotating about their shafts without applying any substantial torque to the gear carrier 42 as in the preferred embodiment.

As the rate of rotation of the power input gear increases, the shaft 13 and the pump 14 run at a faster rate and the centrifugal force of the governor balls 96 moves the conical sleeve 94 to the right of the FIG. 10 position to consequently move the valve spools to the right. As the outlet slots 234 in the valve member 230 move from alignment with outlet port 236 to outlet port 228 and the movement of links 218 and 214 reduce the displacement of variable displacement pump 200, the output of the pump will be gradually reduced to decrease the rate of rotation of the gear pump which in turn causes the link 218 to move to the left and increase the displacement of the variable displacement pump motor device. The effect of this back and forth cycling of the displacement of the variable displacement device is to control the rate of rotation of the gear pump at a constant rate thereby controlling the gear ratio between the input gear 26 and the output 51 at an intermediate value.

The springs 132 and 168 are of such relative strength that the gear pump governor provides the sole variation in the gear ratio until after the intermediate gear ratio is achieved. Thereafter, at a higher input speed, the governor 22 begins to override the governor 20 to provide a further reduction in the displacement of the variable displacement device which decreases the speed of the gear pump and sun gear to decrease the gear ratio between the input gear 26 and the output gear 51. When the variable displacement pump has zero displacement, the gear pump 14, shaft 13 and sun gear 50 are locked to provide a desired minimum gear ratio between the input gear 26 and the output gear 51. During a deceleration of the power input, the exact reverse operation occurs with the gear ratio relatively increasing under the operation of the input governor 22 until the intermediate gear ratio is reached at which time the governor 22 becomes ineffective and the governor 20 then becomes effective for providing further increase in the displacement of the variable displacement pump to increase the gear ratio by reducing resistance to rotation of sun gear 50.

The foregoing embodiment can be operated without the second governor in which case the valve means would be controlled by the first governor only. Also, the displacement of the variable displacement pump motor drive may be controlled manually and for each displacement the transmission will produce a fixed gear ratio between the input and the output gear.

It should be understood that the subject invention is susceptible to many modifications which will be obvious to those of skill in the art and that the spirit and scope of the invention is to be limited solely by the appended claims.

I claim:

1. A variable ratio drive unit comprising a rotary planetary gear carrier, planetary gear means mounted on said rotary planetary gear carrier, rotary sun gear means supported for rotation in meshing engagement with said planetary gear means so as to be rotatable by said planetary gear means, power input drive means drivingly engaged with said planetary gear means, a power output drive means drivingly connected to said rotary planetary gear carrier, a first automatic control means responsive to the rate of rotation of said sun gear for maintaining a constant rate of rotation of said sun gear in response to the sun gear reaching a predetermined rate of rotation and second automatic control means for overriding the first automatic control means in response to said input drive means reaching a predetermined power input rate of rotation for reducing the rate of rotation of the sun gear as the rate of rotation of said input drive means increases above said predetermined power input rate of rotation to provide a minimum gear ratio between said power input drive means and said power output means.

2. The invention of claim 1 wherein said first automatic control means includes a gear pump, drive connection means drivingly connecting said sun gear and said gear pump, pump governor means drivingly connected to said drive connection means, valving means for controlling the output of said gear pump and linkage means connecting said valving means and said pump governor means for actuating said valving means.

3. The invention of claim 2 wherein said second automatic control means includes a power input governor means drivingly connected to said power input means and linkage means connecting said power input governor means to said valving means for actuating said valving means.

4. The invention of claim 1 wherein said first automatic control means includes a gear pump, a first drive connection means drivingly connecting said sun gear and said gear pump, a variable displacement device hydraulically driven by said gear pump, a second drive connection means drivingly connecting said variable displacement pump with said planetary gear carrier, pump governor means drivingly connecting said sun gear and said gear pump, control means for controlling the output of said variable displacement device and linkage means connecting said control means and said pump governor means for actuating said control means.

5. The invention of claim 4 wherein said second automatic control means includes a power input governor means drivingly connected to said power input means and linkage means connecting said power input governor means to said variable displacement pump for controlling the output of said variable displacement pump.

6. The invention of claim 1 wherein said first automatic control means includes a gear pump, drive connection means drivingly connecting said sun gear and said gear pump, governor valving means for controlling the output of said gear pump at a constant flow.

7. The invention of claim 6 wherein said second automatic control means includes a power input governor means drivingly connected to said power input means and linkage means connecting said power input governor means to said governor valving means for actuating said governor valving means.

8. A variable ratio drive unit comprising a housing, main shaft bearing means mounted in said housing, main shaft means mounted for rotation in said main shaft bearing means, a primary input gear bearing means mounted in said housing, a primary input gear concentric with said main shaft and rotatably supported by said primary input gear bearing means, a ring gear fixedly connected to said primary input gear and concentric with said main shaft, a rotary gear carrier concentric with and mounted for rotation about the axis of said main shaft, planetary gear means carried by said rotary gear carrier and meshingly engaging the internal ring gear on the primary input gear, an output gear concentric with and integral with said rotary gear carrier, a sun gear concentrically and fixedly mounted on said main shaft in meshing engagement with said planetary gear means, speed governor means connected to said main shaft for preventing any increase in the speed of said main shaft upon said main shaft reaching a predetermined rate of rotation and input governor control means for overriding said first speed governor means in response to the primary input gear reaching a predetermined input rate of rotation to reduce the rate of rotation of the main shaft means to decrease the gear ratio between said primary input gear and said output gear as the speed of the primary input gear increases above the predetermined rate of rotation.

9. The invention of claim 8 additionally including positive displacement pump means, a drive connection means between said pump and said main shaft and wherein said first speed governor control means includes valving means responsive to the speed of rotation of said main shaft for partially throttling the output from said positive displacement pump means.

10. The invention of claim 8 additionally including positive displacement pump means, a first drive connecting means between said positive displacement pump and said main shaft, a variable displacement pump hydraulically driven by the positive displacement pump means, a second drive connection means drivingly connecting the variable displacement pump with the rotary gear carrier and wherein said first speed governor control means includes control means responsive to the speed of rotation of said main shaft for reducing the displacement of the variable displacement pump to reduce the rate of rotation of the positive displacement pump means.

11. A variable ratio transmission comprising a hollow transmission housing, main control shaft bearing means mounted in said transmission housing, a main control shaft rotatably supported in said main control shaft bearing means in said housing, a primary input gear support means, a primary input gear mounted for rotation on said primary input gear support means in a position in said housing concentric with said main control shaft, ring gear means fixedly connected to said primary input gear and concentric with respect to said main control shaft, a planetary gear carrier concentric with and rotatable about said main control shaft, planetary gear means rotatably supported on said planetary gear carrier in meshing engagement with said internal ring gear, an output gear drivingly connected to said planetary gear carrier, sun gear means mounted on said main control shaft in meshing engagement with said planetary gear means, a hydraulic gear pump fixedly connected to said transmission housing, said hydraulic gear pump including a pump housing and first and second meshing gears, means connecting said first and second meshing gears in driving engagement with said main control shaft, said gear pump housing having an inlet and an outlet communicating with the interior of said transmission housing and a quantity of hydraulic fluid therein, a hydraulic pump speed governor means including valving means for maintaining said pump gears at a predetermined maximum rate of rotation by restricting the outlet from said gear pump housing when said pump gears reach a predetermined rate of rotation and an override governor means for overriding said hydraulic pump speed governor means when said input gear reaches a predetermined rate of rotation to further restrict said outlet of said hydraulic pump to reduce the speed of rotation of said hydraulic pump, said main control shaft and said sun gear to provide a decreasing gear ratio between said primary input gear and said output gear means as the rate of rotation of the primary input gear increases above the second predetermined rate of rotation.

12. The invention of claim 11 wherein said valving means for restricting the outlet from said hydraulic gear pump includes hollow valve spool means of cylindrical configuration having a hollow interior, an inflow opening extending through said valve spool means communicating with said hollow interior of said valve spool means, an outlet opening in said valve spool means communicating externally of the casing of said hydraulic pump with the interior of said transmission housing and means for moving said valve spool means between a first position in which said inflow opening communicates with the interior of said hydraulic pump housing in an internal portion of said pump housing for receiving high pressure hydraulic fluid from said gear members to conduct said high pressure fluid through said outlet opening and a second position in which said inflow opening is positioned in the wall of said pump casing and flow of hydraulic fluid from said casing through said valve means is thereby blocked.

13. The invention of claim 12 wherein said hydraulic pump speed governor means includes a sleeve mounted on said main control shaft for axial movement, means for moving said sleeve in a first direction in an amount in proportion to the speed of rotation of said main control shaft and linkage means connecting said movable sleeve and said valve spool means whereby movement of said sleeve moves said valve spool means between said first valve spool position to an intermediate valve spool position, intermediate said first and second valve spool positions, whereby the flow from said hydraulic gear pump is partially throttled.

14. The invention of claim 13 wherein said override governor means includes a movable conical sleeve mounted on said main control shaft for axial movement between first and second limit positions, means for moving said conical sleeve from said first limit position toward said second limit position as the speed of rortation of said primary input gear increases and linkage means connecting said conical sleeve to said valve spool means for moving said valve spool means between said intermediate valve spool position and said second valve spool position.

15. The invention of claim 11 wherein said valving means for restricting the outlet from said hydraulic gear pump includes a hollow valve spool means of cylindrical configuration having a hollow interior, an inflow opening extending through said hollow interior of said valve spool means, an orifice outlet opening in said valve spool means communicating externally of the casing of said hydraulic pump with the interior of said transmission housing and a biasing spring means for biasing the valve spool means in the direction opposite flow out said orifice and wherein the valve spool means moves between a first position in which said inflow opening communicates with the interior of said hydraulic pump housing in an internal portion of said pump housing for receiving high pressure hydraulic fluid from said gear members to conduct said high pressure fluid through said outlet orifice and a second position in which said inflow opening is positioned in the wall of said pump casing and flow of hydraulic fluid from said casing through said valve means is thereby blocked.

16. In a variable ratio drive unit of the type having an input drive gear, ring gear means integral with said input drive gear, a rotatable planetary gear carrier, planetary gear means mounted on said rotatable planetary gear carrier meshing with said ring gear, a main control shaft, a sun gear fixedly connected to said main control shaft and in meshing engagement with said planetary gear, and a hydraulic pump having an inlet and an outlet and driven by said main control shaft, the improvement comprising automatic control means including valving means for controlling the rate of flow of fluid from said hydraulic pump, speed sensing means responsive to the rate of rotation of said hydraulic pump for maintaining said hydraulic pump at a predetermined maximum rate of rotation by positioning said valving means to adjust the flow of fluid from the hydraulic pump and override means for overriding said speed sensing means to provide an additional restriction of the outlet from said hydraulic pump in response to said input drive gear reaching a predetermined rate of rotation to reduce the rate of rotation of said main control shaft and said sun gear to automatically provide a minimum gear ratio between said input drive gear and said output gear means.

17. A method of automatically varying the input to output gear ratio from an infinite value to a desired minimum value in a variable speed power transmission unit of the type having a power input gear meshing with planetary gears mounted on a rotary planetary gear carrier, a sun gear meshing with the planetary gears and drivingly connected to a gear pump having a fluid inlet and a fluid outlet with valving means in the fluid outlet and a power output gear drivingly connected to the planetary gear carrier, said method comprising the steps of automatically sensing the speed of rotation of the gear pump and the power input gear, initially operating the valving means in the fluid outlet under the sole control of the sensed speed of rotation of the pump to throttle the outlet of the pump in proportion to the speed of rotation of the pump to initially vary the gear ratio from an infinite value to an intermediate value, discontinuing control of the valving means by the speed of rotation of the pump and initiating control of the valving means by the sensed speed of rotation of the power input gear to vary the gear ratio from said intermediate value to said predetermined minimum value by further throttling the output of said pump in proportion to increase in the speed of said power input gear as the speed of said power input gear increases until the pump is substantially completely throttled and said minimum gear ratio is achieved.

18. A method for automatically varying the power input to power output gear ratio of a variable speed power transmission having a power input gear, planetary gears, a sun gear and control means capable of providing a variable resistance to rotation of the sun gear for effecting a change in the gear ratio between power input and power output said method comprising increasing the resistance to rotation of the control means solely in response to increases in speed of the sun gear when the power input speed is below a predetermined value and increasing the resistance to rotation of the control means solely in response to increases in the speed of rotation of the power input when the power input speed is above said predetermined value.

19. The method of claim 18 additionally including decreasing the resistance to rotation of the control means solely in response to decreases in the speed of rotation of the power input when the power input speed is above said predetermined value and decreasing the resistance to rotation of the control means solely in response to decreases in the speed of the sun gear when the speed of the power input is below said predetermined value.

20. A variable ratio transmission comprising a hollow transmission housing, main control shaft bearing means mounted in said transmission housing, a main control shaft rotatably supported in said main control shaft bearing means in said housing, a primary input gear support means, a primary input gear mounted for rotation on said primary input gear support means in a position in said housing concentric with said main control shaft, ring gear means fixedly connected to said primary input gear and concentric with respect to said main control shaft, a planetary gear carrier concentric with and rotatable about said main control shaft, planetary gear means rotatably supported on said planetary gear carrier in meshing engagement with said internal ring gear, an output gear drivingly connected to said planetary gear carrier, sun gear means mounted on said main control shaft in meshing engagement with said planetary gear means, a hydraulic gear pump fixedly connected to said transmission housing, said hydraulic gear pump including a pump housing and first and second meshing gears, means connecting said first and second meshing gears in driving engagement with said main control shaft, said gear pump housing having an inlet and an outlet communicating with the interior of said transmission housing and a quantity of hydraulic fluid therein, a hydraulic pump speed governor means including a variable displacement pump drivingly connected to the planetary gear carrier and having an outlet communicating with the interior of said transmission housing, a valve means in the outlet of the gear pump for maintaining said pump gears at maximum rates of rotation through bypassing the flow of hydraulic fluid from the outlet of said gear pump housing to the interior of the transmission housing and then to direct the flow of hydraulic fluid to the inlet to the variable displacement pump when said gear pump reaches a predetermined rate of rotation and means for decreasing the displacement of the variable displacement pump to a predetermined displacement as the rate of rotation of the gear pump increases, and an override governor means for overriding said hydraulic pump speed governor means when said input gear reaches a predetermined rate of rotation to further restrict the displacement of said variable displacement pump thereby reducing the rate of rotation of said gear pump, said main control shaft and said sun gear to provide a decreasing gear ratio between said primary input gear and said output gear means as the rate of rotation of the primary input gear increases above the second predetermined rate of rotation.

21. The invention of claim 20 wherein said valving means for restricting the outlet from said hydraulic gear pump includes a movable valve spool means of cylindrical configuration having a hollow interior, an inflow opening extending through said valve spool means communicating with said hollow interior of said valve spool means, an outlet opening in said valve spool means communicating externally of the casing of said hydraulic gear pummp with the interior of said transmission housing when the valve spool means is in a first position and communicating with the inlet to the variable displacement pump when the valve spool means is in a second position, and means for moving said valve spool means between said first position and said second position.

22. The invention of claim 21 wherein said hydraulic pump speed governor means includes a movable sleeve mounted on said main control shaft for axial movement, means for moving said sleeve in a first direction in proportion to the speed of rotation of said main control shaft and linkage means connecting said movable sleeve with said valve spool means for changing the displacement of the variable displacement pump whereby movement of said sleeve moves said valve spool means between said first valve spool position and said second valve spool position and whereby movement of said movable sleeve reduces the displacement of the variable displacement pump.

23. The invention of claim 22 wherein said override governor means includes a movable conical sleeve mounted on said main control shaft for axial movement between first and second limit positions, means for moving said conical sleeve from said first limit position toward said second limit position as the speed of rotation of said primary input gear increases and linkage means connecting said conical sleeve to said means for changing the displacement of the variable displacement pump to further reduce the displacement of the variable displacement pump.

24. A method of automatically varying the input to output gear ratio from an infinite value to a desired minimum value in a variable speed power transmission unit of the type having a power input gear meshing with planetary gears mounted on a rotary planetary gear carrier, a sun gear meshing with the planetary gears and drivingly connected to a gear pump having a fluid inlet and a fluid outlet with valving means in the fluid outlet, a variable displacement pump drivingly connected with the rotary planetary gear carrier and having a fluid inlet connected to the outlet of the gear pump and a power output gear drivingly connected to the planetary gear carrier, said method comprising the steps of automatically sensing the speed of rotation of the gear pump and the power input gear, initially operating the valving means in the fluid outlet under the sole control of the sensed speed of rotation of the pump to communicate the outlet of the gear pump with the variable displacement pump and to control the displacement of the variable displacement pump in proportion to the speed of rotation of the gear pump to initially vary the gear ratio from an infinite value to an intermediate value, discontinuing control of the variable displacement pump by the speed of rotation of the gear pump and initiating control of the variable displacement pump by the sensed speed of rotation of the power input gear to vary the gear ratio from said intermediate value to said predetermined minimum value by further reducing the displacement of the variable displacement pump in proportion to increases in the speed of said power input gear as the speed of said power input gear increases until rotation of the gear pump is substantially stopped and said minimum gear ratio is achieved.

25. The invention of claim 24 wherein said override governor means includes a movable conical sleeve mounted on said main control shaft for axial movement between first and second limit positions, means for moving said conical sleeve from said first limit position toward said second limit position as the speed of rotation of said primary input gear increases and linkage means connecting said conical sleeve to said valve spool means for biasing the valve spool toward the second valve spool position.

26. A variable ratio drive unit comprising a rotary planetary gear carrier, planetary gear means mounted on said rotary planetary gear carrier, rotary sun gear means supported for rotation in meshing engagement with said planetary gear means so as to be rotatable by said planetary gear means, power input drive means drivingly engaged with said planetary gear means, a power output drive means drivingly connected to said rotary planetary gear carrier, a gear pump drivingly connected to said sun gear, a variable displacement pump motor device hydraulically driven by said gear pump, a drive connection means drivingly connecting said variable displacement pump motor device with said planetary gear carrier, manually operable means for changing the displacement of the variable displacement pump motor device and means for disconnecting the hydraulic drive from the gear pump to the variable displacement pump motor device when the rate of rotation of the power input means decreases below a predetermined rate of rotation to provide automatic disengaging of the drive unit.

* * * * *